US009159067B1

(12) United States Patent
Lucash

(10) Patent No.: US 9,159,067 B1
(45) Date of Patent: Oct. 13, 2015

(54) PROVIDING CONTENT

(75) Inventor: Nathan Peter Lucash, San Francisco, CA (US)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 13/531,349

(22) Filed: Jun. 22, 2012

(51) Int. Cl.
*G06Q 30/00* (2012.01)

(52) U.S. Cl.
CPC ..................... *G06Q 30/00* (2013.01)

(58) Field of Classification Search
USPC ............... 707/726, 749; 705/26.1, 5; 715/781
See application file for complete search history.

(56) References Cited

U.S. PATENT DOCUMENTS

| 7,539,632 | B1 * | 5/2009 | Chakrabarti et al. ........ 705/26.1 |
| 2004/0181525 | A1 * | 9/2004 | Itzhak et al. ...................... 707/5 |
| 2006/0101341 | A1 | 5/2006 | Kelly et al. |
| 2008/0282186 | A1 * | 11/2008 | Basavaraju ................... 715/781 |
| 2010/0293063 | A1 | 11/2010 | Atherton et al. |
| 2011/0029511 | A1 * | 2/2011 | Kodialam et al. ............. 707/726 |
| 2011/0047006 | A1 | 2/2011 | Attenberg et al. |
| 2011/0106634 | A1 | 5/2011 | Luttrell et al. |
| 2011/0258204 | A1 * | 10/2011 | Hubbard et al. ............. 707/749 |

* cited by examiner

*Primary Examiner* — Saba Dagnew
(74) *Attorney, Agent, or Firm* — Fish & Richardson P.C.

(57) ABSTRACT

Systems and methods of providing information via a computer network are provided. A request for subject matter to display with a web page can be received via a computer network at a data processing system. The data processing system can identify the web page as being ineligible for ad placement based on content of the web page. The data processing system can determine a keyword based at least in part on the content of the web page, and can format the keyword for display with the web page as a link to a second web page. The data processing system can provide the link for display with the web page. The data processing system can receive a request to access the second web page based on an activation of the link. The data processing system can provide the advertisement for display with the second web page.

20 Claims, 3 Drawing Sheets

PROVIDING CONTENT

BACKGROUND

In a networked environment such as the Internet or other networks, entities such as people or companies can provide information for public display, such as on web pages, documents, applications, or other information resources. The Internet content can include text, video, or audio information provided by the entities via a web page server for display on the Internet. Additional content such as advertisements can also be provided by third parties for display on the web pages together with the information provided by the entities. The additional content may or may not be related to the subject matter of the web pages.

SUMMARY OF THE INVENTION

At least one aspect is directed to a computer-implemented method of providing information via a computer network. The method receives, at a data processing system, a request for subject matter to display with a web page via the computer network. The method identifies the web page as being ineligible for ad placement based on content of the web page. The method determines a keyword from the content of the web page, and formats the keyword for display with the web page as a link to a second web page. The method provides the link for display with the web page. The method receives a request to access the second web page based on an activation of the link. The method provides the advertisement for display with the second web page.

At least one aspect is directed to a system of providing information via a computer network. The system includes a data processing system having at least one of a content placement circuit and a content evaluation circuit. The data processing system can receive a request for subject matter to display with a web page via the computer network. The data processing system can identify the web page as being ineligible for ad placement based on content of the web page, and can determine a keyword from the content of the web page. The data processing system can format the keyword for display with the web page as a link to a second web page, and can provide the link for display with the web page. The data processing system can receive a request to access the second web page based on an activation of the link, and can provide the advertisement for display with the second web page.

At least one aspect is directed to a computer readable storage medium having machine instructions stored therein. The instructions are executable by one or more processors to cause the one or more processors to perform operations including instructions to receive a request for subject matter to display with a web page via a computer network. The instructions can include instructions to identify the web page as being ineligible for ad placement based on content of the web page, and to determine a keyword from the content of the web page. The instructions can include instructions to format the keyword for display with the web page as a link to a second web page. The instructions can include instructions to provide the link for display with the web page, and to receive a request to access the second web page based on an activation of the link. The instructions can include instructions to provide the advertisement for display with the second web page.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
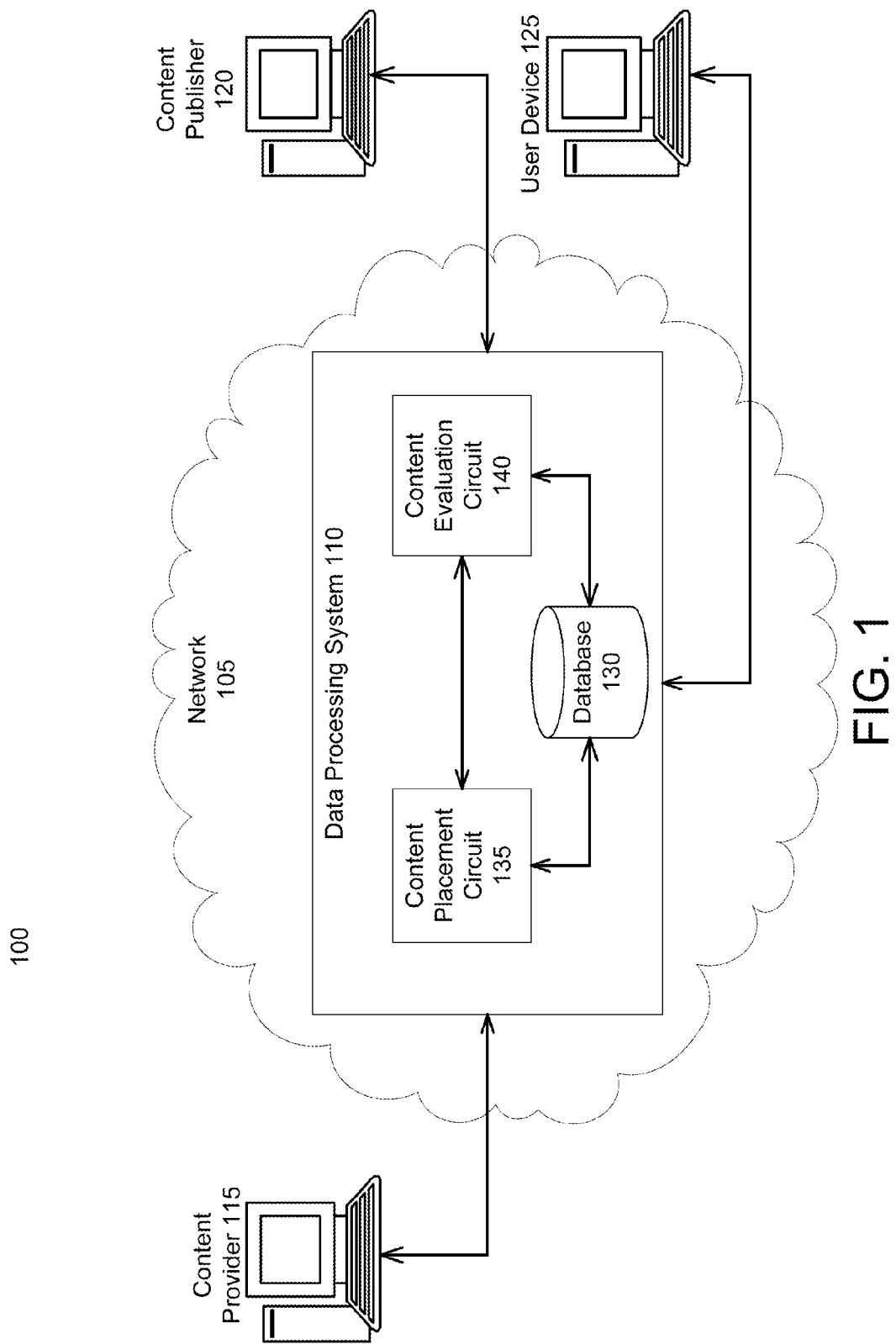
FIG. 1 is a block diagram depicting an example system of providing information via a computer network, according to an illustrative implementation.

Following below are more detailed descriptions of various concepts related to, and embodiments of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A user device can request access to a web page via a computer network. In response, a web page server (e.g., a content publisher) corresponding to that web page can provide content to the user device. The content may include the subject of the web page (e.g., a news article) as well as additional content from a third party, such as an advertisement. For example, the content may include an advertisement tag that causes the user device to retrieve an advertisement via the network from a data processing system such as an ad placement system. The ad placement system can select the appropriate advertisement and provide it to the user device for display with the web page.

Web page content varies, and not all web sites or web pages are eligible for ad placement. For example, web pages may contain objectionable content not suitable for displaying with some advertisements. For example, if a news web page publishes an article having violent content, content providers such as advertisers may not want their advertisements to be placed on that web page because some advertisers may not want their advertisements to appear next to a web page article having violent content.

In some implementations, the ad placement system may identify content on some web pages as being potentially offensive to some people in the absence of an explicit determination that the content is offensive. In such a case, the ad placement system may choose not to show ads on those web pages. When an ad placement system determines that advertisements may be ineligible for placement on a web page, the ad placement system may provide a link to one or more advertisements, and provide the link as an alternative to the advertisement for display with the web page. For example, an ad placement system may determine that the web page may contain explicit content, and may determine to provide a link that indicates a keyword instead of an advertisement on that page for display at a particular user device.

The systems and methods described herein can provide links showing keywords related to the initial advertisement query (e.g., the content of the web page) in an ad slot of a web page having objectionable content. In this example, when users click on those keywords, they can be directed to a different web page in which advertisements may be shown. In this example, an advertiser may object its advertisement appearing on the web page having content objectionable to the advertiser, but may not object if the advertisement is shown on a different web page linked from the page with the objectionable content. In other words, the data processing system can determine that an ad slot of a content web page is suitable for display of a link having a generic keyword in lieu of an advertisement. In this example, the keyword may be related to the content of the advertisement, but does not directly identify the advertiser.

For example, when the ad placement system receives a request for advertisements from a web browser that visits a web page about alcohol, the ad placement system can determine that the alcohol related web page is a site ineligible for advertisements, or for a particular subset of advertisements. In this example, the system can also determine terms or keywords related to the initial advertisement query. Rather than returning alcohol related advertisements for display, the ad placement system can return keywords (e.g., "vodka" or "cocktails") formatted for display on the alcohol related web page as clickable links. Those links, when clicked, can direct a user to a different web page in which advertisements may be shown. In this example, a vodka (or other) content provider indirectly advertises on the alcohol related web page.

FIG. 1 illustrates an example system 100 of providing information via at least one computer network such as the network 105. The network 105 can include computer networks such as the Internet, local, wide, metro or other area networks, intranets, and other computer networks such as voice or data mobile phone communication networks. The system 100 can also include at least one data processing system 110. The data processing system 110 can include at least one logic device such as a computing device having a processor to communicate via the network 105, for example with at least one content publisher 120, at least one user device 125, and at least one content provider 115 (e.g., an advertiser). The data processing system 110 can include a content placement circuit 135 configured to provide content (e.g., an advertisement) to the content publisher 120 or the user device 125, a content evaluation circuit 140 configured to evaluate content of the web page and determine a keyword based on the content, and a database 130 configured to store information. In one implementation, the data processing system 110 can include an ad placement system. The data processing system 110 may also include a search engine or one or more servers.

The user device 125 can include computing devices such as a computer, laptop, desktop, smart phone, tablet, personal digital assistant, or server device configured to communicate with other devices via the network 105. The user device 125 can execute a software application (e.g., a web browser or other application) to retrieve content from other computing devices over network 105.

The content publisher 120 can include a computer having a server configured to host at least one web page. For example, the content publisher 120 may be a computer server (e.g., an FTP server, file sharing server, web server, etc.) or a combination of servers (e.g., a data center, a cloud computing platform, etc.). The content publisher 120 can provide webpage data or other content (e.g., text documents, PDF files, and other forms of electronic documents) to the user device 125. In one implementation, the user device 125 can access the content publisher 120 via the network 105 to request access to a web page of the content publisher 120. Portions of the web page can be dedicated for content such as advertisements.

In one implementation, the data processing system 110 receives, via the network 105, a request for subject matter to display with a web page. The subject matter may include content items such as advertisements, text, images, audio, video, or other content. For example, the content placement circuit 135 can be configured to receive a request from the content publisher 120 or the user device 125. The content publisher 120 may include an operator of a web site, who may have an agreement with the data processing system 110 for the system to provide subject matter or content (e.g., advertisements) to display on the web pages of the content publisher 120. The user device 125 may be a computing device operated by a user (represented by a user identifier), which, when accessing the web page of the content publisher 120, can make a request to the data processing system 110 for advertisements to display on the web page, for instance.

In some implementations, the data processing system 110 can evaluate the web page of the content publisher 120 to obtain the content of the page after the data processing system 110 receives the request. In other implementations, the content of the web page may be stored in and retrieved from the database 130. For example, the data processing system 110 may crawl the web page of the content publisher and store the content in the database 130. The data processing system 110 can detect that the content of the web page has not been changed since the last crawl and retrieve the content from the database 130.

In one implementation, the data processing system 110 can identify the web page as being ineligible for ad placement. For example, the content evaluation circuit 140 can identify that the web page is ineligible for ad placement based on the content of the web page. In some implementations, the content evaluation circuit 140 may identify content on some web pages as being potentially offensive to some people. In such a case the content evaluation circuit 140 may determine the web page is ineligible for ad placement.

For example, the content evaluation circuit 140 may extract terms or keywords from the content of the web page and compares them with a list of predetermined keywords stored in the database 130. The list of predetermined keywords can be a list of terms determined by the content provider 115 (e.g., advertisers) or the ad placement system as being associated with ineligible content for ad placement. For example, the terms associated with drugs, violence, or illegal or immoral or restricted behavior such as "guns," "cocaine," "vodka" may automatically trigger the content evaluation circuit 140 to determine the web page is ineligible for certain advertisements, for example, advertisements about toys, or other content geared toward children.

In other implementations, the content evaluation circuit 140 may assign a rating score to the web page, based on the content of the web page. This rating score can be compared with a threshold score to determine whether the web page is eligible for advertisements. In one implementation, there can be a list of threshold scores and each advertisement stored in the ad repository (e.g., the database 130) can be assigned with a threshold score. When a web page has a rating score above the threshold score assigned to an advertisement, the advertisement may not be displayed on that web page. In some cases, a web page may not be eligible for any advertisements.

For example, when certain keywords appear on a web page with a high frequency or when the rating score of the web page is above any threshold in the list of threshold scores, the content evaluation circuit 140 can determine the web page is ineligible for any advertisements.

In one implementation, the data processing system 110 determines a keyword based at least in part on the content of the web page. For example, the content evaluation circuit 140 can determine one or more keywords based on the content of the web page. The content of the web page can be determined from the title of an article or message displayed on the web page. For example, a web page may have an article entitled "the best time to visit the New York city." From this title, the content evaluation circuit 140 can determine that the web page has content related to traveling, weather, or the city of New York. From this information, the content evaluation circuit 140 may determine suitable keywords such as "cheapest air ticket" or "New York Restaurant". When there are multiple suitable keywords available, the content evaluation circuit 140 may choose a keyword determined to be more searchable or monetizable based on historical data. For example, the keyword may be a term that has been appeared more frequently in search queries of a search engine. A monetizable keyword may be a term associated more frequently with an advertisement having a higher conversion rate (when an advertisement is clicked on, some further desired action occurs on the resulting website, for instance, a purchase is made or contact information is provided, etc.), for example.

In another example, the web page may have a news article with the title "two people killed on the main street by local gang." The content evaluation circuit 140 may determine this is a web page ineligible for ad placement because the web page may contain information about violence. In one implementation, the content evaluation circuit 140 can determine relevant keywords, such as "violence prevention" and "pepper spray," based on the web page content. In this example, the data processing system 110 can determine that the web page is ineligible for ad placement and that an advertiser may not object if its advertisement is shown on a different web page linked to the web page having the article about violence. For example, an advertiser selling pepper spray may not want an advertisement shown on the web page having violent content, but may want a generic link displayed on that web page that when clicked on, displays a second web page that has the advertisement. In this example, the keyword displayed on the web page can be a generic keyword that does not identify the advertiser, such as the keyword "violence prevention" or "pepper spray".

In one implementation, the content evaluation circuit 140 may determine related keywords by examining the terms or a group of terms appeared on the web page. For example, a web page devoted to forum discussion may have the terms such as "houses," "mortgages," "bankruptcy," "foreclosure" appearing frequently on the web page. From this information, the content evaluation circuit 140 may determine relevant keywords such as "best mortgage" or "lowest interest rate" that can be provided as links to a second web page. In this example, an advertiser (e.g., a bank) may not accept its advertisement displaying next to discussions about foreclosure or bankruptcy, but may accept the advertisement to appear on a second web page linked from the keywords such as "best mortgage" or "lowest interest rate".

In some implementations, the nature or characteristics of some web pages may be stored in the database 130. For example, the database 130 may store historical data indicating that a certain uniform resource locator ("URL") is a web page about dating. In this example, the content evaluation circuit 140 may retrieve the historical data from the database 130 and determine that this web page may relate to dating. From this information, the content evaluation circuit 140 can determine a set of relevant keywords, such as "flowers," "chocolates," "engagement rings" that can be provided as links to a second web page in which advertisements may be shown.

In one implementation, the data processing system 110 can identify an advertisement based on the keyword determined from the web page. For example, the content placement circuit 135 can identify an advertisement based on the keyword determined by the content evaluation circuit 140. In one implementation, each advertisement stored in the ad repository (e.g., one of the databases 130) may be associated with a list of keywords. Those keywords may be provided by advertisers. For example, when an advertiser signed up for an advertising campaign, the advertiser may provide a list of keywords that can be used to retrieve its advertisements for display with a web page. An advertising campaign may comprise a series of advertisements that share a single idea and theme which make up an integrated marketing initiative.

In one implementation, the data processing system 110 can format the keyword for display with the web page as a link to a second web page. For example, the content placement circuit 135 can format the keyword identified by the content evaluation circuit 140 to generate a hyperlink to a second web page. A hyperlink or link can be a word, group of words, or image that a user can click on to access a new web page. In one implementation, the content placement circuit 135 can format the keyword as a link using the HTML <a> tag and href attribute. For example, if the keyword is "violence prevention" and the URL of the second web page is http://www.example.com, a link can be formatted as: <a href="http://www.example.com/"> violence prevention </a>. In one implementation, the keyword (e.g., "violence prevention"), the URL (e.g., http://www.example.com) and the advertisement identified based on the keyword may be stored in the database 130 as a historical data record.

In some implementations, instead of formatting the keyword identified based on the content of the web page, the data processing system 110 can format a keyword based on content of the advertisement (e.g., keywords associated with an advertisement) as a link to a second web page. For example, if the keyword identified based on the content of the web page is "vodka", and a keyword associated with an advertisement identified based on the keyword "vodka" can be "liquor". The data processing system 110 in this example may use the keyword "liquor" as the keyword to format a link to a second web page.

The data processing system 110 can provide the link for display with the web page. For example, the content placement circuit 135 can provide the link for display in the ad slot of the web page. In one implementation, after the data processing system 110 identifies the web page as being ineligible for ad placement, identifies one or more keywords as relevant to the content of the web page, and formats the keyword as a link for display with web page, the data processing system 110 can provide the link to the web page for display in lieu of an advertisement. For example, if the keyword is "violence prevention," a link will be displayed in the ad slot of the web page, showing the words "violence prevention" as a link. In one implementation, a second web page having the violence prevention advertisement can be displayed when a user of the user device 125 clicks on the "violence prevention" link on a web page ineligible for direct ad placement due to violent content.

In one implementation, the data processing system 110 can receive, via the network 105, a request to access the second web page based on an activation of the link. For example, one of the servers of the data processing system 110 can be configured to receive the request to access the second web page from the user device 125. In one implementation, after a user who operates the user device 125 clicks on the link displayed in an ad slot of the web page, the user device 125 can send a request to the data processing system 110 to access the second web page. The server of the data processing system 110 can receive the request and identify it as a request to access the second web page.

In one implementation, the data processing system 110 can provide the advertisement for display with the second web page. For example, the content placement circuit 135 can provide the advertisement for display with the second web page, responsive to a user clicking a link on the first web page. In one implementation, the server of the data processing system 110, upon receiving the request for accessing the second web page, can make a request to the content placement circuit 135 for ad placement on the second web page. The content placement circuit 135 can identify that the URL of the second web page is associated with an advertisement stored in the database 130. In this example, the content placement circuit 135 can retrieve the advertisement from the database 130 and provide it to the server of the data processing system 110 for displaying with the second web page. The sever of data processing system 110 can send the second web page with the advertisement to the user device 125, using the Hypertext Transfer Protocol (HTTP), for example.

In one implementation, the data processing system 110 can determine that a keyword fits, or does not fit into the dimensions of an ad slot on the web page. For example, the content placement circuit 135 can determine the length of a keyword based on the number of characters in the keyword. The content placement circuit 135 can then compare the length of the keyword with the dimensions of the ad slot. In one implementation, the dimensions of the ad slot can be sent with the request from the user device 125 to the data processing system 110. In this implementation, for example, the keyword may be used for display as a link on the web page when the content placement circuit 135 determines that the keyword can fit into the ad slot. In one implementation, based on the dimensions of the ad slot, the data processing system 110 can determine that the ad slot is of sufficient size to include multiple keywords. In such a case, the data processing system 110 may provide a second keyword for display together with the keyword in the ad slot.

In one implementation, the data processing system 110 can provide a second link for display with the web page. The second link can correspond to supplemental content which may be unrelated to the content of the web page. For example, the content evaluation circuit 140 may determine that there is no keyword based on the content of the web page or that an identified keyword is not suitable for display on the web page. In such a case, the content placement circuit 135 may format a link to another web page in which the content is not related to the content of the web page. For example, the content placement circuit 135 may format a link that indicates a keyword or a list of keywords that are related to the popular or trending topics of the day (e.g., "presidential election," "royal wedding," or current events or news stories, for example). In this example, upon the user activation of the link, a web page about the popular topics may be displayed on the user device 125.

In one implementation, the data processing system 110 can provide a non-link image for display with the web page. For example, the image can be a product image that is related to the content of the web page and that is not a link. For example, a web page may discuss the high burglary rate in a certain neighborhood. The data processing system 110 may provide an image of a lock displayed in the ad slot, suggesting that a lock may be a good product to help prevent burglaries. In this example, a non-link image may be provided when the data processing system 110 determines that the content is objectionable to some users but not to others, such as content about buying a gun or alcohol. In another implementation, the data processing system 110 can display a non-link image generally unrelated to the content of the web page. For example, a non-link image of flowers or a scenic lake may be displayed on the web page having the objectionable content.

In one implementation, the data processing system 110 can provide an input field for a search query in an ad slot of the web page. For example, the content placement circuit 135 can provide the input field for display in the ad slot. The data processing system 110 can receive a search term via the search query input field. For example, the search engine of the data processing system 110 can receive the search term from the user device 125 via the network 105. The search term can be entered into the search query input field by a user at the user device 125. In one implementation, the data processing system 110 can provide a list of results corresponding to the search term to be displayed on another web page. For example, the data processing system 110 can include or communicate with a search engine to generate a response to a search query.

Figure 2:
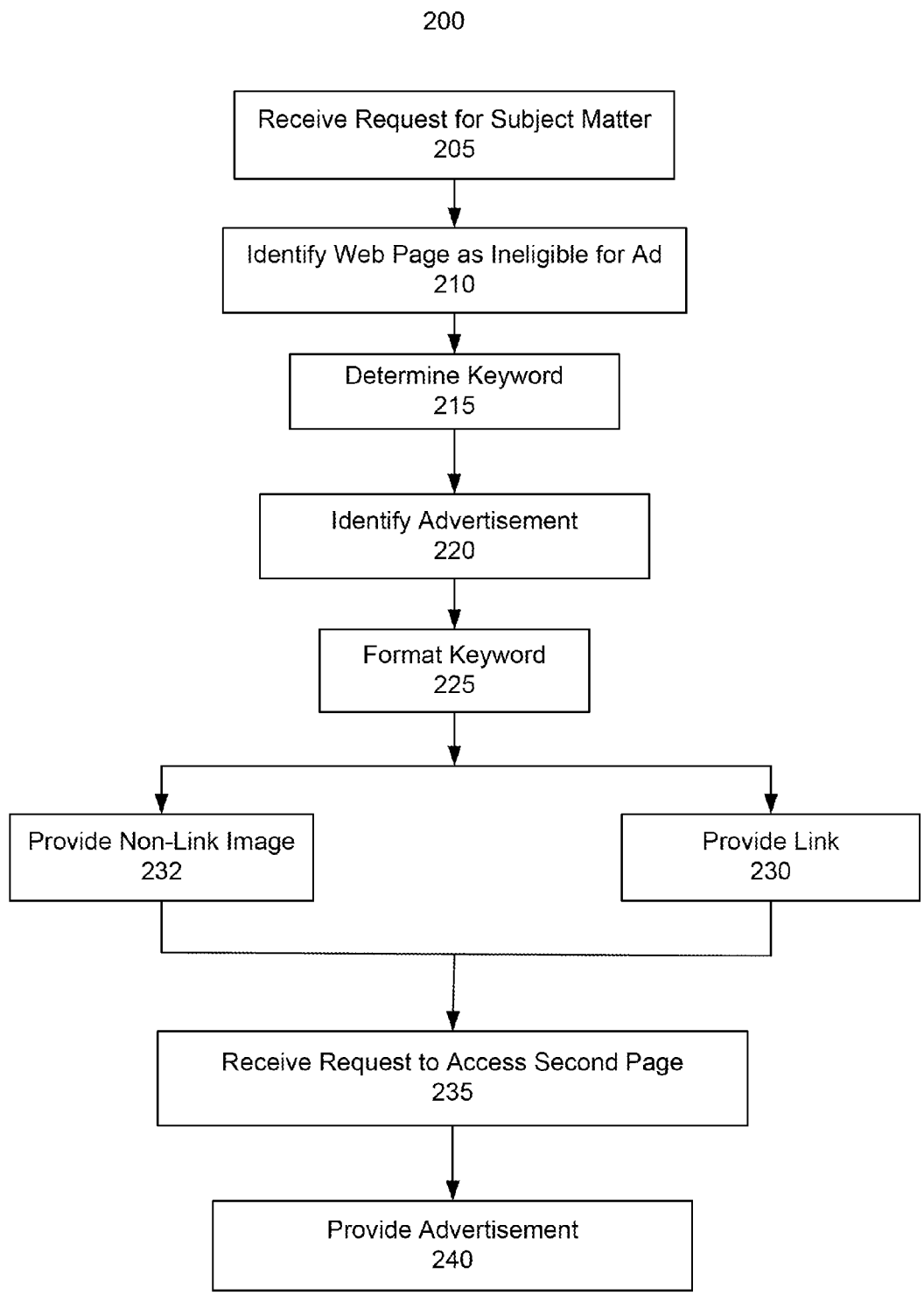
FIG. 2 is a flow diagram depicting a method of providing information via a computer network, according to an illustrative implementation.

FIG. 2 illustrates a flow diagram depicting a method 200 of providing information via a computer network. The method 200 can receive a request for subject matter to display with a web page via a network (BLOCK 205). For example, a data processing system having a content evaluation circuit can receive a request from a user device or a content publisher. In one implementation, the received request includes a request for placing an advertisement in an ad slot of the web page.

The method 200 can identify the web page as being ineligible for ad placement (BLOCK 210). For example, the content evaluation circuit can identify that the web page is ineligible for ad placement based on the content of the web page. In one implementation, the content evaluation circuit can identify the content as being ineligible for ad placement (BLOCK 210) based on the terms or keywords of the web page. In another implementation, the content evaluation circuit can assign a rating score to a web page and compare the rating score with a threshold to determine the eligibility of the web page for ad placement. In some implementations, the content evaluation circuit may identify content on some web pages as being potentially offensive to some people and may determine the web page is ineligible for ad placement (BLOCK 210).

The method 200 can determine a keyword based at least in part on the content of the web page (BLOCK 215). For example, the content evaluation circuit can determine a keyword (BLOCK 215) based on the content, such as the topics discussed on the web page. In one implementation, the content evaluation circuit can determine the keyword (BLOCK 215) based on the title of the article on the web page. In another implementation, the content evaluation circuit can determine the keyword (BLOCK 215) based on the terms or group of terms appeared on the web page. In yet another implementation, the content evaluation circuit determines the keyword (BLOCK 215) based on the historical data stored in a database, which may reveal the nature or characteristics of the web page.

The method 200 can identify an advertisement based on the keyword (BLOCK 220). For example, the content placement circuit can identify an advertisement based on the keyword determined by the content evaluation circuit (BLOCK 215). In one implementation, the content placement circuit can identify the advertisement (BLOCK 220) by matching the keyword with advertiser provided keywords stored with the advertisement in the database.

The method 200 can format the keyword for display with the web page as a link to a second web page (BLOCK 225). For example, the content placement circuit can format the keyword determined by the content evaluation circuit (BLOCK 215) as a link to a second web page. In one implementation, the content placement circuit can format the keyword as a hyperlink using the HTML <a> tag and href attribute. In some implementations, instead of formatting the keyword identified based on the content of the web page, the data processing system can format a keyword based on content of the advertisement (e.g., keywords associated with an advertisement) as a link to a second web page.

The method 200 can provide the link for display with the web page (BLOCK 230). For example, the content placement circuit can provide the link for display in an ad slot of the web page. In one implementation, the link, when clicked on by a user, can redirect the user to a second web page. In some implementations, the content placement circuit can also provide a second link for display with the web page. The second link can correspond to supplemental content that may be unrelated to the content of the web page. For example, the second link may correspond to the popular topics of the day.

In some implementations, the data processing system can provide a non-link image for display with the web page (BLOCK 232). For example, when the content evaluation circuit does not determine with a sufficient level of certainty that the content of a web page is negative, the data processing system may provide a non-link image which may be related to the content of the web page for display in the ad slot of the web page. In other implementations, the data processing system can provide a search query input field for display in the ad slot of the web page. In one example, the data processing system may receive a search term via the search query input field. Continuing with this example, the search engine of the data processing system can provide a list of results corresponding to the search term to be displayed on another web page.

The method 200 can receive a request to access the second web page (BLOCK 235). For example, a server of the data processing system can receive a request to access the second web page based on an activation of the link from a user device. In one implementation, the server of the data processing system can identify that the second web page includes an ad slot and make a request to the content placement circuit for an advertisement or other content.

The method 200 can provide the advertisement for display with the second web page (BLOCK 240). For example, the content placement circuit can retrieve the advertisement from a database and provide it to the server of the data processing system, which can send the second web page with the advertisement to the user device.

In some implementations, the data processing system can determine whether a keyword can fit into the dimensions of an ad slot on the web page. For example, the content placement circuit can determine the length of a keyword based on the number of characters in the keyword and then compare the length of the keyword with the dimensions of the ad slot. If the keyword can fit into the ad slot, the keyword can be used for display as a link on the web page. In another example, based on the dimensions of the ad slot, the data processing system can determine that the ad slot is of sufficient size to include multiple keywords. The data processing system may provide a second keyword for display in the ad slot.

Figure 3:
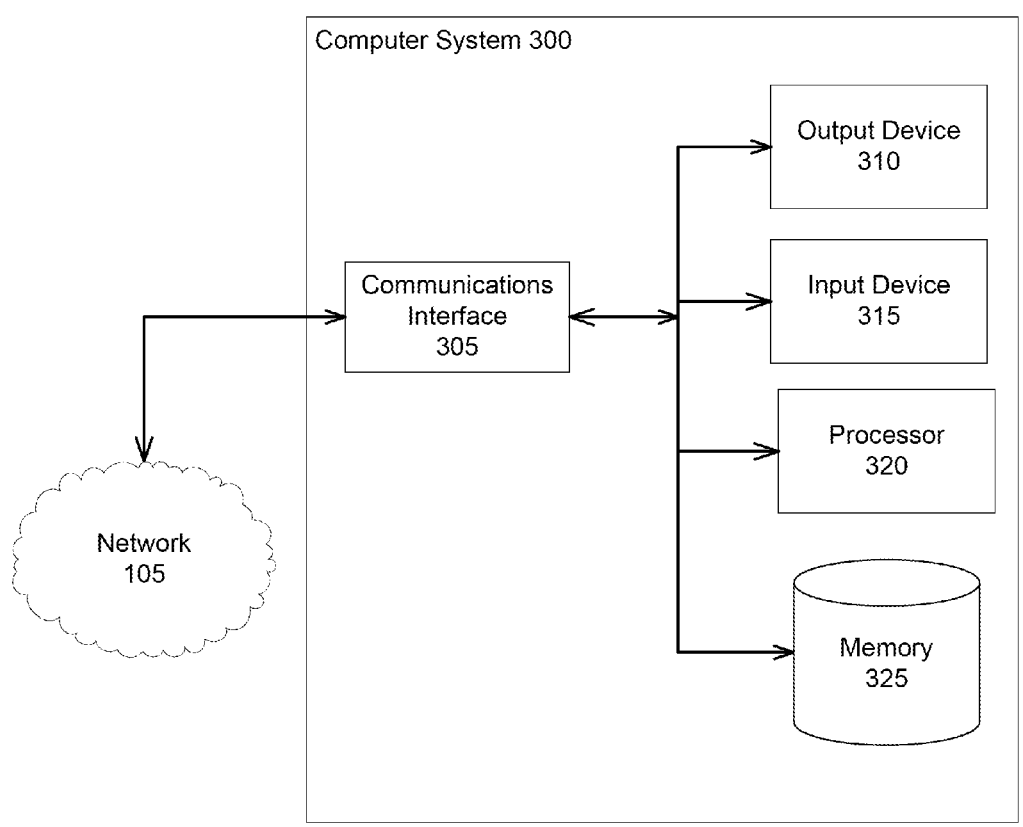
FIG. 3 is a block diagram illustrating a general architecture for a computer system that may be employed to implement various elements of the systems and methods described and illustrated herein, according to an illustrative implementation.

FIG. 3 shows the general architecture of an illustrative computer system 300 that may be employed to implement any of the computer systems discussed herein (including the system 100 and its components such as the content placement circuit 135 and the content evaluation circuit 140) in accordance with some embodiments. The computer system 300 can be used to provide information via the network 105. The computer system 300 of FIG. 3 comprises one or more processors 320 communicatively coupled to memory 325, one or more communications interfaces 305, and one or more output devices 310 (e.g., one or more display units) and one or more input devices 315. The processors 320 can be included in data processing system 110 or the other components of the system 100 (such as the content placement circuit 135 and the content evaluation circuit 140).

In the computer system 300 of FIG. 3, the memory 325 may comprise any computer readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the content placement circuit 135 and the content evaluation circuit 140 can include the memory 325 to store the advertisement identified from the keyword as well as the URL of the second web page. The processor(s) 320 shown in FIG. 3 may be used to execute instructions stored in the memory 325 and, in so doing, also may read from or write to the memory various information processed and or generated pursuant to execution of the instructions.

The processor 320 of the computer system 300 shown in FIG. 3 also may be communicatively coupled to or control the communications interface(s) 305 to transmit or receive various information pursuant to execution of instructions. For example, the communications interface(s) 305 may be coupled to a wired or wireless network, bus, or other communication means and may therefore allow the computer system 300 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 300. Examples of communications interfaces 305 include user interfaces (e.g., web pages) having content (e.g., advertisements) selected by the content placement circuit 135 and provided by the content provider 115 for placement on the web pages.

The output devices 310 of the computer system 300 shown in FIG. 3 may be provided, for example, to allow various information to be viewed or otherwise perceived in connection with execution of the instructions. The input device(s) 315 may be provided, for example, to allow a user to make manual adjustments, make selections, enter data or various other information, or interact in any of a variety of manners with the processor during execution of the instructions. Additional information relating to a general computer system architecture that may be employed for various systems discussed herein is provided at the conclusion of this disclosure.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer readable storage device, a computer readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer readable storage devices or received from other sources.

The term "data processing apparatus," "data processing system," or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content placement circuit 135 and the content evaluation circuit 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 300 or system 100 can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of the systems and methods described herein. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. For example, the content placement circuit 135 and the content evaluation circuit 140 can be a single module, a logic device having one or more processing circuits, or part of a search engine.

Having now described some illustrative implementations and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one embodiment are not intended to be excluded from a similar role in other implementations or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one embodiment, the systems and methods described herein consist of one, each combination of more than one, or all of the described elements, acts, or components.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the embodiment may be included in at least one implementation or embodiment. Such terms as used herein are not necessarily all referring to the same embodiment. Any embodiment may be combined with any other embodiment, inclusively or exclusively, in any manner consistent with the aspects and embodiments disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of providing information via a computer network, comprising:
   receiving, by a data processing system and from a content publisher computing device via a computer network communication, a request for subject matter to display with a web page;
   identifying, by one or more processors of the data processing system, the web page as being ineligible for ad placement based on content of the web page;
   determining, by one or more processors of the data processing system, a keyword based at least in part on the content of the web page identified as ineligible for ad placement;
   identifying, by one or more processors of the data processing system, an advertisement based on the keyword;
   formatting the keyword for display with the web page identified as ineligible for ad placement as a link to a second web page;
   providing the link for display in an ad slot of the web page identified as ineligible for ad placement;
   receiving, via the computer network, a request to access the second web page based on an activation of the link; and
   providing, responsive to the request and via the computer network, the advertisement for display with the second web page.

2. The method of claim 1, further comprising:
   providing a second link for display with the web page, wherein the second link corresponds to supplemental content unrelated to the content of the web page.

3. The method of claim 1, further comprising:
   providing a non-link image for display with the web page based on content of the web page.

4. The method of claim 1, further comprising:
   providing a search query input field for display with the web page in the ad slot.

5. The method of claim 4, further comprising:
   receiving a search term via the search query input field; and
   providing results to the search term, wherein the results are configured for display on a third web page.

6. The method of claim 5, further comprising:
   providing access to the third web page.

7. The method of claim 1, further comprising:
   determining, based on dimensions of the ad slot, that the ad slot is of sufficient size to include a display of the keyword.

8. The method of claim 7, further comprising:
   determining, based on dimensions of the ad slot, that the ad slot is of sufficient size to include a plurality of keywords; and
   providing a second keyword for display concurrent with the keyword in the ad slot.

9. A system of providing information via a computer network, comprising:
   a data processing system having one or more processors, the data processing system configured to:
   receive, from a content publisher computing device via a computer network communication, a request for subject matter to display with a web page;
   identify the web page as being ineligible for ad placement based on content of the web page;
   determine a keyword based at least in part on the content of the web page identified as ineligible for ad placement;
   identify an advertisement based on the keyword;
   format the keyword for display with the web page identified as ineligible for ad placement as a link to a second web page;
   provide the link for display in an ad slot of the web page identified as ineligible for ad placement;
   receive, via the computer network, a request to access the second web page based on an activation of the link; and
   provide, via the computer network, the advertisement for display with the second web page.

10. The system of claim 9, further comprising the data processing system configured to provide a second link for display with the web page, wherein the second link corresponds to supplemental content unrelated to the content of the web page.

11. The system of claim 9, further comprising the data processing system configured to provide a non-link image for display with the web page based on content of the web page.

12. The system of claim 9, wherein the web page includes a second ad slot, further comprising the data processing system configured to provide a search query input field for display with the web page in the second ad slot.

13. The system of claim 12, further comprising the data processing system configured to:
   receive a search term via the search query input field; and
   provide results to the search term, wherein the results are configured for display on a third web page.

14. The system of claim 13, further comprising the data processing system configured to provide access to the third web page.

15. The system of claim 9, further comprising the data processing system configured to determine, based on dimensions of the ad slot, that the ad slot is of sufficient size to include a display of the keyword.

16. The system of claim 15, further comprising the data processing system configured to:
   determine, based on dimensions of the ad slot, that the ad slot is of sufficient size to include a plurality of keywords; and
   provide a second keyword for display concurrent with the keyword in the ad slot.

17. A computer readable storage device having machine instructions stored therein, the instructions being executable by one or more processors to cause the one or more processors to perform operations comprising:
   receiving a request for subject matter to display with a web page;
   identifying the web page as being ineligible for ad placement based on content of the web page;

determining a keyword based at least in part on the content of the web page identified as ineligible for ad placement;

identifying an advertisement based on the keyword;

formatting the keyword for display with the web page identified as ineligible for ad placement as a link to a second web page;

providing the link for display with the web page identified as ineligible for ad placement;

receiving a request to access the second web page based on an activation of the link; and providing the advertisement for display with the second web page.

18. The computer readable storage device of claim 17, the instructions further comprising:

providing a second link for display with the web page, wherein the second link corresponds to supplemental content unrelated to the content of the web page.

19. The computer readable storage device of claim 17, the instructions further comprising:

providing a non-link image for display with the web page based on content of the web page.

20. The computer readable storage device of claim 17, the instructions further comprising:

providing a search query input field for display with the web page in a second ad slot.

* * * * *